Oct. 29, 1963
J. F. OLSEN
3,108,852
METHOD OF MAKING RESILIENT AND FLEXIBLE
CUSHIONING AND SEALING ELEMENTS
Filed March 31, 1958
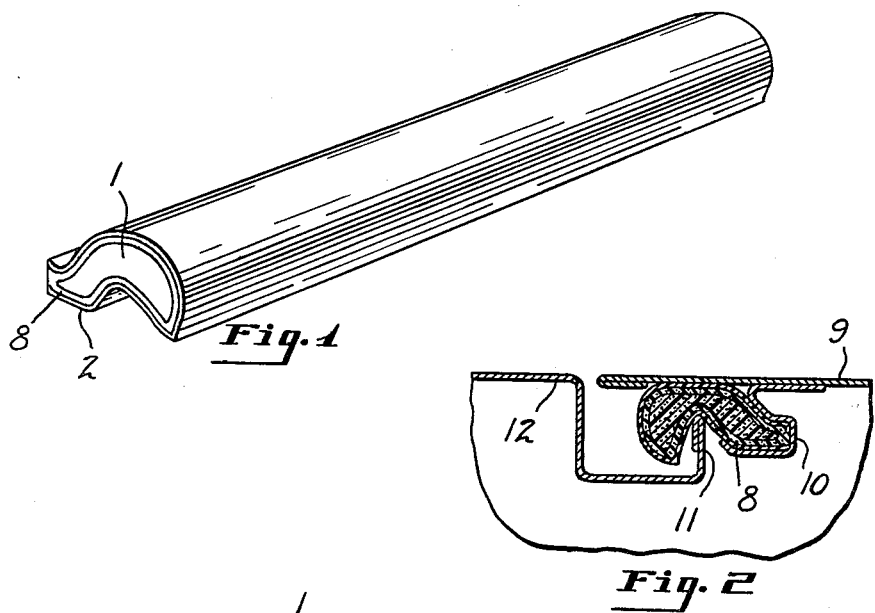
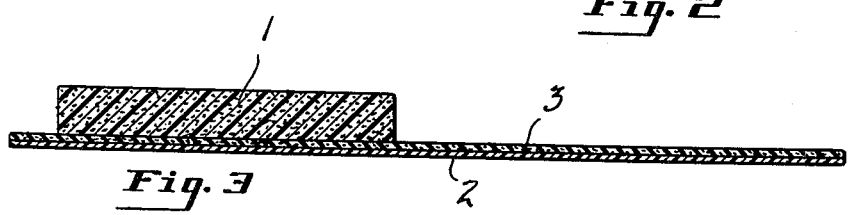
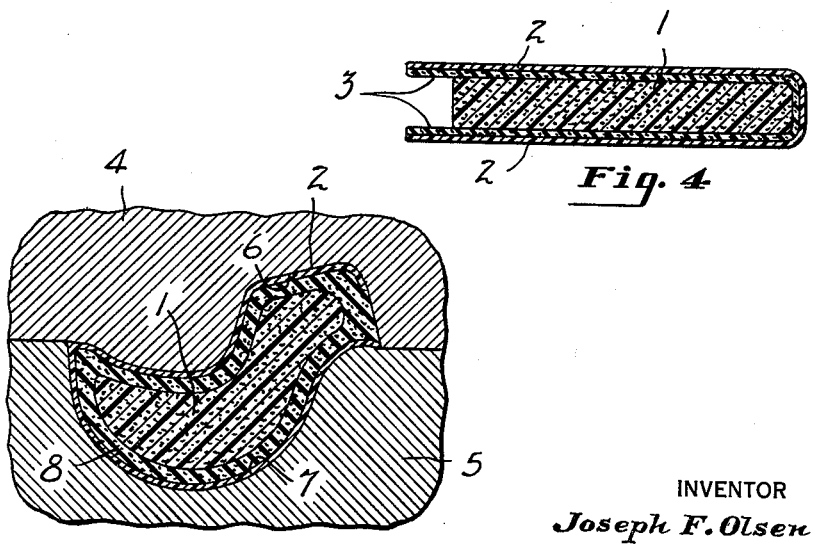
INVENTOR
Joseph F. Olsen
BY McCoy, Greene & LeGrotenhuis
ATTORNEYS

United States Patent Office 3,108,852
Patented Oct. 29, 1963

3,108,852
METHOD OF MAKING RESILIENT AND FLEXIBLE CUSHIONING AND SEALING ELEMENTS
Joseph F. Olsen, Wabash, Ind., assignor to The General Tire & Rubber Company, Akron, Ohio, a corporation of Ohio
Filed Mar. 31, 1958, Ser. No. 725,084
4 Claims. (Cl. 18—59)

This invention relates to a method of making cushioning and sealing elements which have a resilient and flexible cellular core and a flexible impermeable skin.

In making the cellular core articles by the method of the present invention, a core composed of a relatively soft resilient foamed thermoplastic material is enveloped in a covering of thin, flexible laminated sheet material that has an external layer composed of a vulcanizable rubber compound and an internal layer composed of a vulcanizable sponge rubber compound that contains a blowing agent. After application of the envelope to the core, the article is shaped under pressure in the mold while heat is applied thereto to blow the sponge rubber and to vulcanize the rubber compounds. The sponge rubber is expanded when subjected to heat in a mold, presses the external rubber layer into conformity with the interior of the mold cavity, fills the space between the thermoplastic core and the outer rubber skin and becomes permanently adhered both to the outer skin and to the core as the rubber is vulcanized. The configuration of the core may be changed during the shaping operation as the article is being forced into conformity with the mold cavity and, since the core is formed of thermoplastic material, the altered shape is retained after removal from the mold.

The method of the present invention may be advantageously used in the manufacture of sealing and cushioning strips in which case a strip of foamed thermoplastic material such as polyurethane is enclosed in an envelope of unvulcanized sheet rubber that is in the form of laminated sheet material composed of a layer of vulcanizable rubber compound and a layer of vulcanizable sponge rubber compound containing a blowing agent. The two rubber sheets can be readily formed and joined together in a rubber calendering machine and strips of the proper width and length for application to the core strip may be cut from the laminated sheet so formed.

The invention has for its principal objects to provide cushioning or sealing strips of high resilience that provide effective cushioning and that are relatively soft and deformable to conform to surface irregularities in sealing areas.

Reference should be had to the accompanying drawings forming a part of this specification, in which:

FIGURE 1 is a perspective view of a sealing strip embodying the invention;

FIG. 2 is a sectional view showing the strip employed as a seal for a door or lid;

FIG. 3 is a sectional view showing the foamed core strip placed upon the sponge rubber layer of the laminated covering sheet;

FIG. 4 shows the covering sheet wrapped about the core strip; and

FIG. 5 shows the completed cushioning strip in a vulcanizing mold, the core being shown shaped to conform to the finished strip and the sponge rubber being blown to expand the strip and the mold and force the outer rubber skin into conformity with the interior of the mold cavity.

In making a cushioning strip by the method of the present invention, a strip 1 of a thermoplastic foam such as foamed polyurethane, polyvinylchloride, or polyvinylacetate, but which is preferably a foamed polyurethane, is laid upon a composite strip of sheet rubber which is composed of a layer 2 of a soft vulcanizable rubber compound and a layer 3 of a soft, vulcanizable sponge rubber compound containing a blowing agent. The strip 1 may be rectangular in cross section and the rubber strip may be of a width to wrap around the strip 1, or may be in the form of strips applied to the opposite faces of the strip 1.

The strip shown in FIG. 4 composed of the core 1 and the covering rubber layers 2 and 3 is placed in a suitable vulcanizing mold which has upper and lower mold members 4 and 5 provided with opposed cavities 6 and 7 in which the strip is received. Heat is supplied to the mold to vulcanize the rubber compounds and convert the blowing agent in the internal layer 3 of the rubber envelope into a gas to form a relatively thick sponge rubber layer 6 between the outer rubber skin and the thermoplastic core 1. The skin layer 2 may be of any suitable natural or synthetic rubber compound capable of forming when vulcanized an elastic and flexible skin layer. The sponge layer 3 may also be of any suitable natural rubber or synthetic rubber compound capable of adhering to the rubber skin 2 and to the core 1.

The skin layer 2 and the sponge rubber layer 3 can be readily calendered and joined together in a rubber calendering machine. The thickness of the calendered sheets may vary considerably, the sponge rubber sheet being usually somewhat thicker than the skin forming sheet. For example, for sealing strips such as shown in the accompanying drawings, the rubber skin may be from .010″ to .015″ thick and the sponge layer .020″ to .025″ prior to blowing.

Any one of many well known sponge rubber compounds may be employed and, since the compounding of rubber with blowing agents, vulcanizing agents, fillers, plasticizers and other ingredients is well known in the art, it is to be understood that the invention is not limited to any particular rubber compounds, either for the skin or the sponge rubber layer. However, an example of a compound which may be used for the sponge rubber layer is as follows.

| Ingredients: | Parts by weight |
|---|---|
| Smoked sheet | 70 |
| GR–S | 30 |
| Calcium carbonate (filler) | 170 |
| Sodium bicarbonate (blowing agent) | 8.5 |
| Stearic acid | 8.5 |
| Zinc carbonate | 9 |
| Paraffin oil | 20 |

The above ingredients which form the masterbatch, may be mixed in a Banbury, the smoke sheet and the GR–S having been previously masticated to increase the plasticity thereof. In the mixing, care is taken to keep the temperature to a point below that which will cause the blowing agent to blow prematurely. The masterbatch is then mixed with the vulcanizing agents, retarders, antioxidants, etc., after which the rubber compound is calendered and applied to the sheet of uncured rubber which may be similar to the sponge rubber compound except that it contains no blowing agent.

Both the sponge rubber compound and the skin compound may be composed entirely of synthetic rubber, but it is preferred to employ a mixture with natural rubber at least for the sponge compound in order to obtain better adhesion between the sponge rubber layer and the skin layer and between the sponge rubber layer and the cellular core.

It is to be understood that in accordance with the provisions of the patent statutes, variations and modifications of the specific devices herein shown and described may be made without departing from the spirit of the invention.

What I claim is:
1. The herein described method of making an article having a core composed of a resilient cellular material and a flexible impermeable skin which comprises enveloping a body of foamed thermoplastic material with a thin laminated covering consisting of an external layer composed of a vulcanizable rubber compound and an internal layer composed of a vulcanizable sponge rubber compound containing a blowing agent, enclosing said body and enveloping sheet material in a mold and applying heat to blow the sponge rubber compound and expand the same and press said external layer into conformity with the interior of the mold cavity and to press and set the foamed core to a shape substantially corresponding to the external shape of the molded article and to vulcanize the rubber compounds.

2. The herein described method of making an article having a core composed of a resilient cellular material and a flexible impermeable skin which comprises enveloping a body of foamed polyurethane with a thin laminated covering consisting of an external layer composed of a vulcanizable rubber compound and an internal layer composed of a vulcanizable sponge rubber compound containing a blowing agent, enclosing said body and enveloping sheet material in a mold and applying heat to blow the sponge rubber compound and expand the same to press said external layer into conformity with the interior of the mold cavity, to press and set the foamed core to a shape substantially corresponding to the external shape of the article and to vulcanize the rubber compounds.

3. The herein described method of making a sealing strip which comprises enveloping a strip of resilient foamed thermoplastic material with thin laminated sheet material consisting of an external layer composed of a vulcanizable rubber compound and an internal layer of a vulcanizable sponge rubber compound containing a blowing agent, and shaping the covered strip under pressure in a mold by applying heat to blow the sponge rubber compound to expand the same and press said external layer into conformity with the interior of the mold and to press and set said thermoplastic foam strip to a shape substantially corresponding to that of the exterior of the molded article and to vulcanize the rubber compounds.

4. The herein described method of making a sealing strip which comprises enveloping a strip of resilient foamed polyurethane with a laminated sheet material consisting of an internal layer of a vulcanizable sponge rubber compound and an external layer of a vulcanizable rubber compound, and shaping the covered strip under pressure in a mold by applying heat to blow the sponge rubber compound to expand said external layer into conformity with the interior of the mold and to press and set said thermoplastic foamed strip to a shape substantially corresponding to that of the exterior of the molded article and to vulcanize the rubber compounds.

References Cited in the file of this patent

UNITED STATES PATENTS

| | | |
|---|---|---|
| 1,998,817 | Meyer | Apr. 23, 1935 |
| 2,204,622 | Reid | June 18, 1940 |
| 2,344,575 | Warren | Mar. 21, 1944 |
| 2,586,275 | Toulmin | Feb. 19, 1952 |
| 2,644,280 | O'Neil | July 7, 1953 |
| 2,757,423 | Wurtz et al. | Aug. 7, 1956 |
| 2,774,120 | Beare | Dec. 18, 1956 |
| 2,845,997 | Waite | Aug. 5, 1958 |
| 2,884,668 | Harris et al. | May 5, 1959 |
| 2,970,347 | Massopust | Feb. 7, 1961 |

FOREIGN PATENTS

| | | |
|---|---|---|
| 490,461 | Great Britain | Aug. 11, 1938 |